United States Patent
Draper (10) Patent No.: US 9,003,761 B2
(45) Date of Patent: Apr. 14, 2015

(54) SYSTEM AND METHOD FOR EXHAUST GAS USE IN GAS TURBINE ENGINES

(75) Inventor: Samuel David Draper, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 1012 days.

(21) Appl. No.: 12/790,275

(22) Filed: May 28, 2010

(65) Prior Publication Data

US 2011/0289930 A1  Dec. 1, 2011

(51) Int. Cl.
 *F02C 6/00* (2006.01)
 *F02C 6/18* (2006.01)
 *F02C 3/34* (2006.01)

(52) U.S. Cl.
 CPC ... *F02C 6/18* (2013.01); *F02C 3/34* (2013.01); Y02E 20/16 (2013.01)

(58) Field of Classification Search
 USPC .......... 60/39.15, 39.5, 39.52, 39.183, 39.182, 60/781, 39.12
 See application file for complete search history.

(56) References Cited

U.S. PATENT DOCUMENTS

| | | | |
|---|---|---|---|
| 2,621,475 A * | 12/1952 | Loy | 60/774 |
| 4,313,300 A | 2/1982 | Wilkes et al. | |
| 5,491,970 A | 2/1996 | Davis, Jr. et al. | |
| 5,794,421 A | 8/1998 | Maichle | |
| 5,943,866 A | 8/1999 | Lovett et al. | |
| 6,202,400 B1 | 3/2001 | Utamura et al. | |
| 6,205,765 B1 | 3/2001 | Iasillo et al. | |
| 6,272,842 B1 | 8/2001 | Dean | |
| 6,340,002 B1 * | 1/2002 | Liebig | 122/7 R |
| 6,354,071 B2 | 3/2002 | Tegel et al. | |
| 6,430,915 B1 * | 8/2002 | Wiant et al. | 60/39.12 |
| 6,598,402 B2 | 7/2003 | Kataoka et al. | |
| 6,820,431 B2 | 11/2004 | McManus et al. | |
| 6,823,253 B2 | 11/2004 | Brunell | |
| 6,910,335 B2 * | 6/2005 | Viteri et al. | 60/786 |
| 6,923,002 B2 | 8/2005 | Crawley et al. | |
| 6,951,193 B1 | 10/2005 | Draper | |
| 6,976,351 B2 | 12/2005 | Catharine et al. | |
| 7,032,388 B2 | 4/2006 | Healy | |
| 7,104,070 B2 | 9/2006 | Iasillo et al. | |

(Continued)

FOREIGN PATENT DOCUMENTS

CN 1477297 A 2/2004
CN 101187338 A 5/2008

OTHER PUBLICATIONS

Unofficial English Translation of CN Office Action issued May 28, 2014 in connection with corresponding CN Patent Application No. 201110153460.4.

(Continued)

*Primary Examiner* — Phutthiwat Wongwian
*Assistant Examiner* — Steven Sutherland
(74) *Attorney, Agent, or Firm* — Fletcher Yoder, P.C.

(57) ABSTRACT

In one embodiment, a system is provided that includes a first gas turbine engine. The first gas turbine engine has a first compressor configured to intake air and to produce a first compressed air and a first combustor configured to combust a first mixture to produce a first combustion gas. The first mixture has a first fuel, at least a first portion of the first compressed air, and a second combustion gas from a second gas turbine engine. The first gas turbine engine also includes a first turbine configured to extract work from the first combustion gas.

18 Claims, 6 Drawing Sheets

(56) References Cited

U.S. PATENT DOCUMENTS

| | | |
|---|---|---|
| 7,232,290 B2 | 6/2007 | Draper et al. |
| 7,246,002 B2 | 7/2007 | Healy et al. |
| 7,266,940 B2 * | 9/2007 | Balan et al. .............. 60/39.181 |
| 7,320,213 B2 | 1/2008 | Shah et al. |
| 7,490,472 B2 * | 2/2009 | Lynghjem et al. .............. 60/772 |
| 2007/0006592 A1 | 1/2007 | Balan et al. |
| 2008/0104938 A1 | 5/2008 | Finkenrath et al. |
| 2008/0295604 A1 | 12/2008 | Hoyte et al. |
| 2009/0044542 A1 | 2/2009 | Thatcher et al. |
| 2009/0056334 A1 | 3/2009 | West et al. |
| 2010/0092280 A1 | 4/2010 | Draper |

OTHER PUBLICATIONS

Chinese Office Action for Chinese Patent Application No. 201110153460.4, mailed Jan. 29, 2015.

* cited by examiner

SYSTEM AND METHOD FOR EXHAUST GAS USE IN GAS TURBINE ENGINES

BACKGROUND OF THE INVENTION

The subject matter disclosed herein relates to the use of exhaust gas in gas turbine engines. Specifically, exhaust gas is used as a recirculated working fluid for stoichiometric combustion within one or more gas turbine engines.

In general, gas turbine engines combust a mixture of compressed air and fuel to produce combustion gases. The combustion gases may flow through one or more turbine stages to generate power for a load and/or a compressor. The combustion gases may include various combustion by-products, such as carbon monoxide (CO), nitrous oxide and its derivatives ($NO_x$), carbon dioxide ($CO_2$), and so on. These by-products, or emissions, are generally subject to regulations, which are becoming increasingly stringent. Unfortunately, emissions reduction techniques often result in a decrease in performance or efficiency.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, a system is provided that includes a first gas turbine engine, having a first combustor configured to combust a first mixture to produce a first combustion gas, a first turbine configured to extract work from the first combustion gas and output a first exhaust gas, and a first compressor configured to compress the first exhaust gas to produce a compressed exhaust gas. The first gas turbine engine routes a first portion of the compressed exhaust gas to the first combustor, and the first gas turbine engine is configured to route a second portion of the compressed exhaust gas to a second gas turbine engine.

In another embodiment, a system is provided that includes a first gas turbine engine. The first gas turbine engine has a first compressor configured to intake air and to produce a first compressed air and a first combustor configured to combust a first mixture to produce a first combustion gas. The first mixture has a first fuel, at least a first portion of the first compressed air, and a second combustion gas from a second gas turbine engine. The first gas turbine engine also includes a first turbine configured to extract work from the first combustion gas.

In a further embodiment, a method of operation of a gas turbine engine system is provided. The method includes combusting a fuel mixture within a first combustor of a first gas turbine engine to produce a combustion gas, extracting work from the combustion gas using a first turbine of the first gas turbine engine to produce an exhaust gas, and compressing the exhaust gas using a compressor of the first gas turbine engine to produce a compressed exhaust gas. A first portion of the compressed exhaust gas is provided back to the first combustor and a second portion of the compressed exhaust gas is provided to one or more separate gas turbine engines.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is generally directed to stoichiometric exhaust gas recirculation (SEGR) in gas turbine engines. In one implementation, two gas turbine engines ingest air into their compressors. Approximately 21% of the air is extracted from each compressor and piped to a third gas turbine engine, where it is fed to one or more SEGR combustors, mixed with recirculated exhaust gas (exhaust gas recirculation (EGR)), and combusted stoichiometrically (i.e., leaving substantially no remaining $O_2$). The products of combustion pass through a turbine of the third gas turbine engine, through a $NO_x$ catalyst (destroying substantially all $NO_x$ within the gas). The exhaust gas then passes through a heat recovery steam generator (HRSG) and is recirculated to the inlet of the third gas turbine engine.

In one embodiment, the third gas turbine engine compressor compresses only exhaust gas. Approximately 42% of the exhaust gas is extracted from the compressor of the third gas turbine engine, split, and directed to the first two gas turbine engines. In the first two gas turbine engines, the exhaust gas recirculation (EGR) is mixed with fuel and air. Due to the substantial absence of $O_2$ from the EGR, the EGR is capable of acting as a diluent. Therefore, the overall concentration of byproduct gases (such as $NO_x$) produced during combustion within the first two gas turbine engines may be reduced. In some implementations, the $NO_x$ emissions resulting from such a configuration may be more than approximately one-third (⅓) lower than three gas turbine engines operating with substantially equal levels of EGR (such as when all three gas turbine engines are equally configured).

Figure 1:
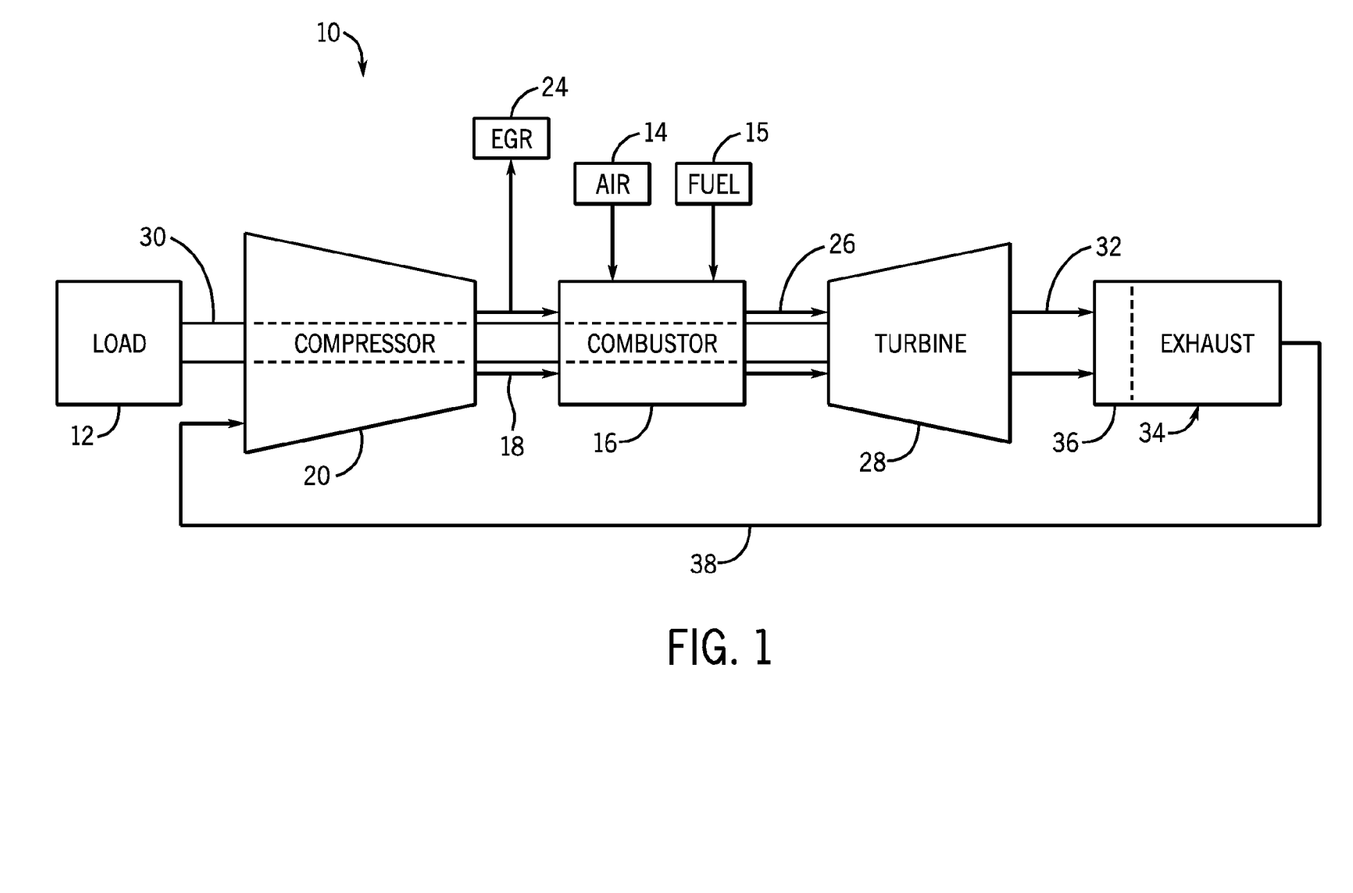
FIG. 1 is a diagrammatic illustration of a gas turbine engine configured to recirculate exhaust gas for use as a working fluid, in accordance with one embodiment of the present disclosure.

According to present embodiments, these and other processes may be performed or facilitated by a gas turbine engine having features configured to perform exhaust gas recirculation and combustion. One embodiment of such a gas turbine engine is illustrated in FIG. 1, which is a block diagram of one embodiment of an exhaust gas recirculation (EGR) gas turbine engine 10. As an example, the EGR gas turbine engine 10 may be part of a combined cycle system. The EGR gas turbine engine 10 is generally configured to drive a load 12 by combusting a mixture of compressed air 14 and fuel 15 (e.g., natural gas, light or heavy distillate oil, naphtha, crude oil, residual oil, or syngas). The combustion is performed within a combustor 16, which may include one or more combustion chambers. It should be noted that unlike conventional gas turbine engines, the EGR gas turbine engine 10 may not include an air intake into a compressor 20 (e.g., one or more compression stages). Rather, the combustor 16 receives a stream of compressed EGR 18 provided by the compressor 20. While the combustor 16 receives a portion of the stream of compressed EGR 18, another portion is provided to one or more separate gas turbine engines as a compressed EGR export stream 24. The process of providing the compressed EGR export stream 24 is discussed in further detail with respect to FIGS. 2-4.

To begin the combustion process within the combustor 16, the compressed EGR 18 may mix with the compressed air 14 (which is injected into the one or more combustion chambers of the combustor 16) and ignition may occur. The ignition produces hot combustion gases 26 that power the gas turbine engine 10. More specifically, the hot combustion gases 26 flow through a turbine 28 (e.g. one or more turbine stages) that drives the load 12 via a shaft 30. For example, the combustion gases 26 may apply motive forces (e.g., via convection, expansion, and the like) to turbine rotor blades within the turbine 28 to rotate the shaft 30. In an example process, the hot combustion gases 26 from the combustor 16 pass through the turbine 28. The hot combustion gases 26 may force turbine blades in the turbine 28 to rotate the shaft 30 along an axis of the gas turbine engine 10. As illustrated, the drive shaft 30 is connected to various components of the gas turbine engine 10, including the compressor 20.

The drive shaft 30 may connect the turbine 28 to the compressor 20 to form a rotor. The compressor 20 may include blades coupled to the drive shaft 30. Thus, rotation of turbine blades in the turbine 28 may cause the drive shaft 30 connecting the turbine 28 to the compressor 20 to rotate blades within the compressor 20. This rotation of blades in the compressor 20 causes the compressor 20 to compress a source of EGR to generate the compressed EGR stream 18. A portion of the compressed EGR stream 18 is then fed to the combustor 16 and mixed with other combustion components. Additionally, as noted above, a separate portion of the compressed EGR stream 18 is provided to one or more separate gas turbine engines as the exported EGR 24. The shaft 30 may drive the compressor 20 in addition to or in lieu of the load 12. As an example, the load 12 may be a generator, a propeller, a transmission, or a drive system, among others.

Once the turbine 28 extracts work from the hot combustion gases 26, a stream of exhaust gas 32 may be provided to an exhaust section 34, where the exhaust gas 32 may be cooled or further processed. For example, the exhaust section 34 may include a catalyst section 36 which includes a carbon monoxide (CO) catalyst, a $NO_x$ catalyst, an unburned hydrocarbon catalyst, or any similar metal-based catalyst (e.g., platinum-based catalysts). In the illustrated embodiment, the catalyst section 36 includes a $NO_x$ catalyst that is configured to destroy nearly all $NO_x$ gases within the stream of exhaust gas 32 and excludes a CO catalyst. The stream of exhaust gas 32 may then exit the exhaust section 34 as an exhaust gas recirculation (EGR) stream 38. The EGR stream 38 is then compressed by the compressor 20 and provided to the combustor 16 as the compressed EGR stream 18 and exported as compressed EGR 24. The exported EGR 24 may be provided, for example, to other gas turbine engines or to other processes utilizing inert gases (e.g., gases substantially free of $O_2$). Such processes may include enhanced oil recovery, fire retardant purging at gas refineries, and so on. Indeed, any system benefiting from the use of gases that are substantially free of $O_2$ are contemplated herein.

Figure 2:
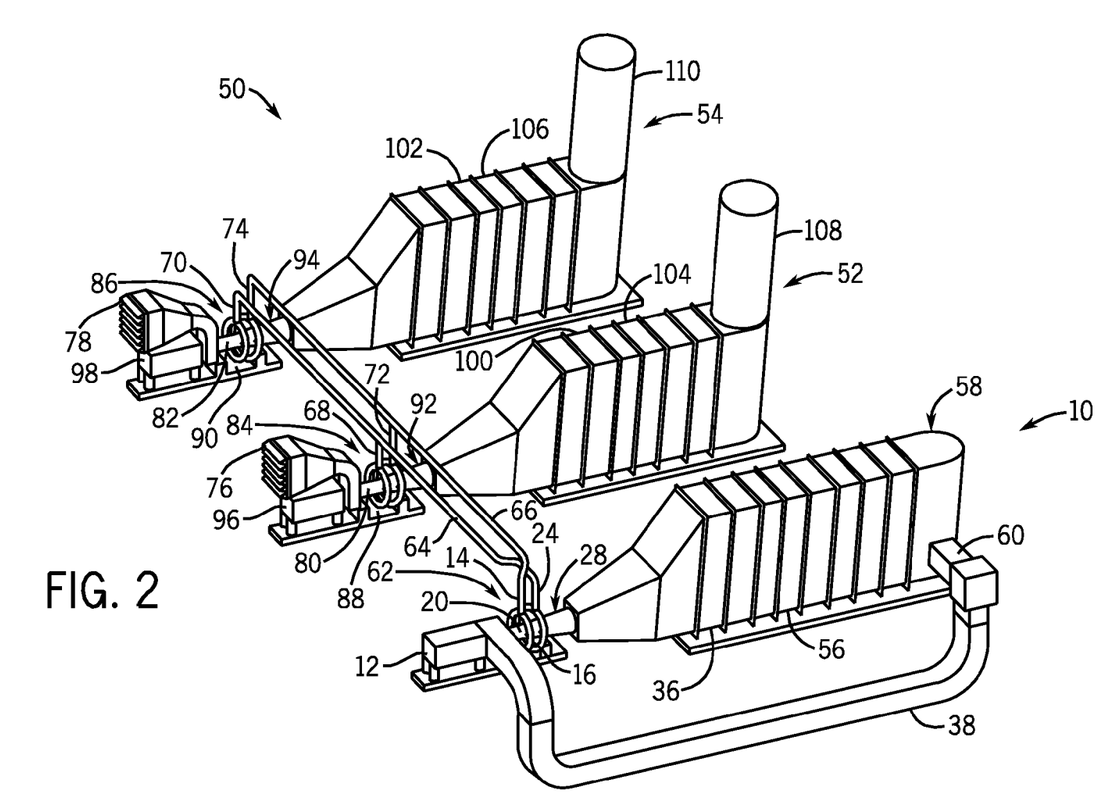
FIG. 2 is a diagrammatic illustration of a gas turbine engine system having three interconnected gas turbine engines, and one of the gas turbine engines is configured to recirculate exhaust gas for use as a working fluid, in accordance with one embodiment of the present disclosure.

In present embodiments, the compressed EGR stream 18 may be split, with a first portion being provided to the combustor 16 and a second portion being sent to the one or more other gas turbine engines as the exported EGR stream 24. The one or more gas turbine engines may be conventional gas turbine engines that have been re-plumbed or re-configured to accept EGR into one or more respective combustion chambers. FIG. 2 is an illustration of one embodiment of using the EGR gas turbine engine 10 in a system 50 that includes one EGR gas turbine engine and two other, separate gas turbine engines. Specifically, the system 50 includes a first gas turbine engine 52 and a second gas turbine engine 54, which include areas that have been configured to accept the exported EGR stream 24 from the EGR gas turbine engine 10. The first and second gas turbine engines 52 and 54 are described in further detail below.

During operation of the system 50, the stream of compressed EGR 18 flows into the combustor 16 of the EGR gas turbine engine 10. Within the combustor 16, the air 14 and fuel 15 are combusted stoichiometrically in the presence of the EGR stream 18, where substantially all of the oxygen ($O_2$) present within the combustor 16 is ignited. Consequently, the resultant hot combustion gases 26 may contain an increased amount of carbon monoxide (CO) relative to conventional gas turbine engines and may be substantially free of $O_2$ (e.g., containing less than approximately 2, 1.5, 1, 0.5, or 0.25% $O_2$ based on the total volume of combustion gas). CO production and use are described in further detail below. Nevertheless, the hot combustion gases 26 are then sent to the turbine 28, which extracts work from the hot combustion gases 26 to drive the compressor 20 and/or the load 12, which produces the exhaust gas 32.

According to the illustrated embodiment, the exhaust gas 32 is then sent to a heat recovery steam generator (HRSG) 56. The HRSG 56 operates as the exhaust section 34 described in FIG. 1, and includes the catalyst section 36, which includes a $NO_x$ catalyst. It should be noted that in embodiments utilizing an HRSG, the placement of the catalyst section 36 may at least partially determine the temperature at which the exhaust gas 32 is treated by the catalyst within the catalyst section 36. For example, at a forward portion of the HRSG 56 (such as at a portion closer to the turbine 28), the exhaust gas 32 may be hotter than at a rearward portion of the HRSG 56 (such as the opposite side from the turbine 28) due to heat transfer to produce steam, gas expansion and so forth. As an example, the $NO_x$ catalyst within the catalyst section 36 may treat the exhaust gas 32 at a temperature of between approximately 1000 and 1200° F. (e.g., approximately 1000, 1050, 1100, 1150, or 1200° F.), which may be advantageous for the $NO_x$ breakdown processes performed by the catalyst. As noted above, the exhaust gas 32 may include a significant portion of CO. In some embodiments, it may be desirable to use the CO as an energy source during combustion. Accordingly, the catalyst within the catalyst section 36 may not break down any significant portion of the CO. That is, the catalyst section 36 may exclude a CO catalyst. The use of CO as a fuel is described in further detail below with respect to the discussion of the first and second gas turbine engines 52 and 54.

After substantially all $NO_x$ gases within the exhaust gas 32 have been destroyed, the exhaust gas 32 progressively cools as it passes through the HRSG 56. In the illustrated embodiment, the exhaust gas 32 may be used to generate high-pressure, high-temperature steam. The steam produced by the HRSG 56 may then be passed through various features of the plant for power generation, which is described in further detail with respect to FIG. 6 below. In addition, the produced steam may also be supplied to any other processes where steam may be used, such as to a gasifier. The HRSG 56 of the EGR gas turbine engine 10 may be a specially-configured HRSG that includes an extended portion 58 to allow for additional cooling. In some embodiments, such additional cooling may be desirable for increasing the efficiency of various processes, such as steam generation and compression within the compressor 20. Accordingly, the exhaust stream 32 may be cooled to between approximately 50 and 150° F. (e.g., approximately 50, 60, 70, 80, 90, 100, 110, 120, 130, 140, or 150° F.). Further, it should be noted that unlike some gas turbine engine configurations, the EGR gas turbine engine 10 does not have an exhaust stack. Rather, the EGR gas turbine engine 10 feeds the exhaust stream 32 back into the gas turbine engine system 50.

Thus, after the exhaust stream 32 is cooled, it may enter into a conduit 60, which may be a duct or similar gas vent feature. The conduit 60 leads the exhaust stream 32 back to the compressor 20 of the EGR gas turbine engine 10. As noted above, the compressor 20 compresses the stream of exhaust 32 to generate the compressed EGR stream 18. According to the present approaches, the compressed EGR stream 18 enters into a combustor area 62, which contains various features (e.g., valves, manifolds, and so forth) for separating the EGR stream 18 into two or more portions. The valves may control the relative amounts of the EGR stream 18 that are directed to the first and second gas turbine engines 52 and 54 as well as the relative amount of compressed air 14 entering into the combustor 16.

The amount of the exported EGR 24 relative to the amount of the EGR stream 18 provided to the combustor 16 may be at least partially determined by the number of separate gas turbine engines within the system 50 and the amount of EGR relative to $O_2$ suitable for stoichiometric combustion. For example, in some embodiments, a ratio of approximately 60% EGR to approximately 40% air may be suitable for stoichiometric combustion (substantial total consumption of $O_2$). Therefore, approximately 40%±10% of the EGR stream 18 is exported EGR 24 to the first and second gas turbines 52 and 54, which is replaced by approximately 40% import of the compressed air 14 from the first and second gas turbine engines 52 and 54. According to the present embodiments, the amount of EGR export 24 and the amount of compressed air 14 import may be divided substantially equally between the first and second gas turbine engines 52 and 54. Therefore, approximately 20% of the export EGR 24 is provided to each gas turbine engine 52 and 54. Similarly, approximately 20% of the air ingested by each of the first and second gas turbine engines 52 and 54 is compressed and provided to the EGR gas turbine engine 10 as the import compressed air 14. It should be noted that the approximate ratio of EGR to air may remain substantially unchanged by the number of gas turbine engines other than the EGR gas turbine engine 10. Therefore, the amount of import compressed air 14 and exported EGR 24 may be divided equally among one, two, three, four or more separate gas turbine engines, with each providing approximately 40, 20, 13.3, 10% or less, respectively. Indeed, any number of separate gas turbine engines may be used in any combination according to the disclosed embodiments. For example, the EGR gas turbine engine 10 may provide EGR to any of a plurality of gas turbine engines (e.g., any of a first, second, third, fourth and so on) and receive compressed air from any of the plurality. Further, more than one EGR gas turbine engine may be used, with the ratios being evenly distributed or separated and evenly distributed accordingly.

During operation of the system 50, the air 14 is provided directly to the combustor 16 (combustion chambers of the combustor 16) via a compressed air conduit 66 fluidly connecting the first and second gas turbine engines 52 and 54 with the EGR gas turbine engine 10. Similarly, the exported EGR 24 flows through a compressed EGR conduit 64 fluidly connecting the EGR gas turbine engine 10 with the first and second gas turbine engines 52 and 54. Specifically, the compressed EGR conduit 64 leads to a first EGR inlet 68 of the first gas turbine engine 52 and a second EGR inlet 70 of the second gas turbine engine 54. In a similar manner, the compressed air 14 generated by the first and second gas turbine engines 52 and 54 is provided to the compressed air conduit 66 via a first compressed air outlet 72 and a second compressed air outlet 74, respectively.

To generate the compressed air 14 that is provided to the EGR gas turbine engine 10, the first and second gas turbine engines 52 and 54 ingest air (e.g., ambient air) through respective first and second air intakes 76 and 78. A first air compressor 80 (e.g., one or more compression stages) of the first gas turbine engine 52 and a second air compressor 82 (e.g., one or more compression stages) of the second gas turbine engine 54 compress the ingested air to generate the compressed air 14. While the compressed air 14 is in a first combustor area 84 (e.g. upstream of a combustion zone) of the first gas turbine engine 52 and a second combustor area 86 (e.g. upstream of a combustion zone) of the second gas turbine engine 54, a defined amount (e.g., approximately 21%) of the compressed air 14 may be withdrawn into the first and second compressed air outlets 72 and 74, sent through the compressed air conduit 66, and provided to the EGR gas turbine engine 10 as the lone source of $O_2$ injected into the combustor 16.

Combustion of fuel (such as fuel 15) within the first and second gas turbine engines 52 and 54 is performed within respective first and second combustors 88 and 90. It should be noted that the exported EGR 24 is provided to the first and second combustors 88 and 90 directly into their combustion chambers, which may dilute the concentration of fuel within each. Indeed, if each combustor 88, 90 includes multiple combustion chambers, then the exported EGR 24 may be injected to each. The diluent effect of the EGR may control the peak flame temperature within the combustors 88, 90. Additionally, the levels of $NO_x$ present within the combustion gases that result from combustion within the first and second combustors 88 and 90 may be decreased due to the diluent effect. Therefore, it may be possible to reduce the average concentrations of $NO_x$ gases within combustion gases produced by such combustion processes (e.g., to no more than approximately 1, 2, 5, 10, or 15 parts per million volume (ppmv) $NO_x$).

Once the combustion gases have been produced within the first and second combustors 88 and 90, they are sent to a first gas turbine 92 of the first gas turbine engine 52 and a second gas turbine 94 of the second gas turbine engine 54, where work is extracted from the hot combustion gases as described above with respect to FIG. 1. The work extracted by the first and second gas turbines 92 and 94 may result in rotation of one or more features, such as a shaft connecting the gas turbines 92, 94 to respective loads 96 and 98. Alternatively or additionally, the gas turbines 92 and 94, by extracting work from the combustion gases produced within the combustors 88 and 90, may drive the respective compressors 80, 82 of the first and second gas turbine engines 52 and 54.

In a similar manner to the process described above with respect to the EGR gas turbine engine 10, the extraction of work from the hot combustion gas by the first and second gas turbines 92 and 94 produces respective streams of exhaust gases. The exhaust gas streams then progress through a first HRSG 100 of the first gas turbine engine 52 and a second HRSG 102 of the second gas turbine engine 54. However, unlike the EGR gas turbine engine 10, the first and second HRSGs 100 and 102 do not have respective catalyst sections disposed at a forward portion of each. Rather, a first catalyst section 104 and a second catalyst section 106 of each gas turbine engine are disposed towards a middle portion of each HRSG due to the operating temperature of the catalyst within each catalyst section. For example, the first catalyst section 104 and the second catalyst section 106 may include only a CO catalyst, as the combustion gases resulting from combustion within the first combustor 88 and the second combustor 90 may contain levels of $O_2$ that preclude the use of other catalyst types, such as $NO_x$ catalysts or other catalysts that are substantially affected by the presence of $O_2$. However, it should be noted that other methods of $NO_x$ reduction are contemplated herein, such as by selective catalytic reduction using ammonia. Nevertheless, the $N_2$ and/or $CO_2$ produced by the catalyst sections 104 and 106 may be used for various plant processes, such as carbon capture.

Once the exhaust gases pass through the first and second catalyst sections 104 and 106, the exhaust gases continue to cool as they progress through the first and second HRSGs 100 and 102. In the illustrated embodiment, the first and second HRSGs 100 and 102 may be of conventional size, such that the temperature of the combustion gases cool to between approximately 150 and 200° F. (e.g., approximately 150, 160, 170, 180, 190, or 200° F.) towards the end of the HRSGs 100 and 102. Once the exhaust gases have progressed through the HRSGs 100 and 102, the exhaust gases may exit the first and second gas turbine engines 52 and 54 via a first exhaust stack 108 and a second exhaust stack 110, respectively.

As noted above, the exhaust gases may include $N_2$ and $CO_2$, which may be used for carbon capture, in a gasification process, or exported as value-added gas streams. It should be noted that in embodiments where the system 50 is part of a gasification plant, that the first and second exhaust stacks 108, 110 may be connected, either directly or indirectly, to one or more absorber columns. For example, the first and second exhaust stacks 108, 110 may each be connected, via conduits, to respective $CO_2$ absorbers for carbon capture. In such embodiments, the present approaches may beneficially provide cooled and/or compressed exhaust gases which may be suitably treated by $CO_2$ absorbers of reduced size compared to conventional configurations, such as a size reduction of approximately 33% in the illustrated embodiment. Alternatively or additionally, the number of $CO_2$ absorbers may be reduced, for example from three to two in the illustrated embodiment. The size reduction and/or number reduction of the $CO_2$ absorbers may depend on a variety of factors including the number of gas turbine engines utilized, the types and temperatures of solvents used for treatment, the size of the HRSGs on the gas turbine engines, and so forth.

Figure 3:
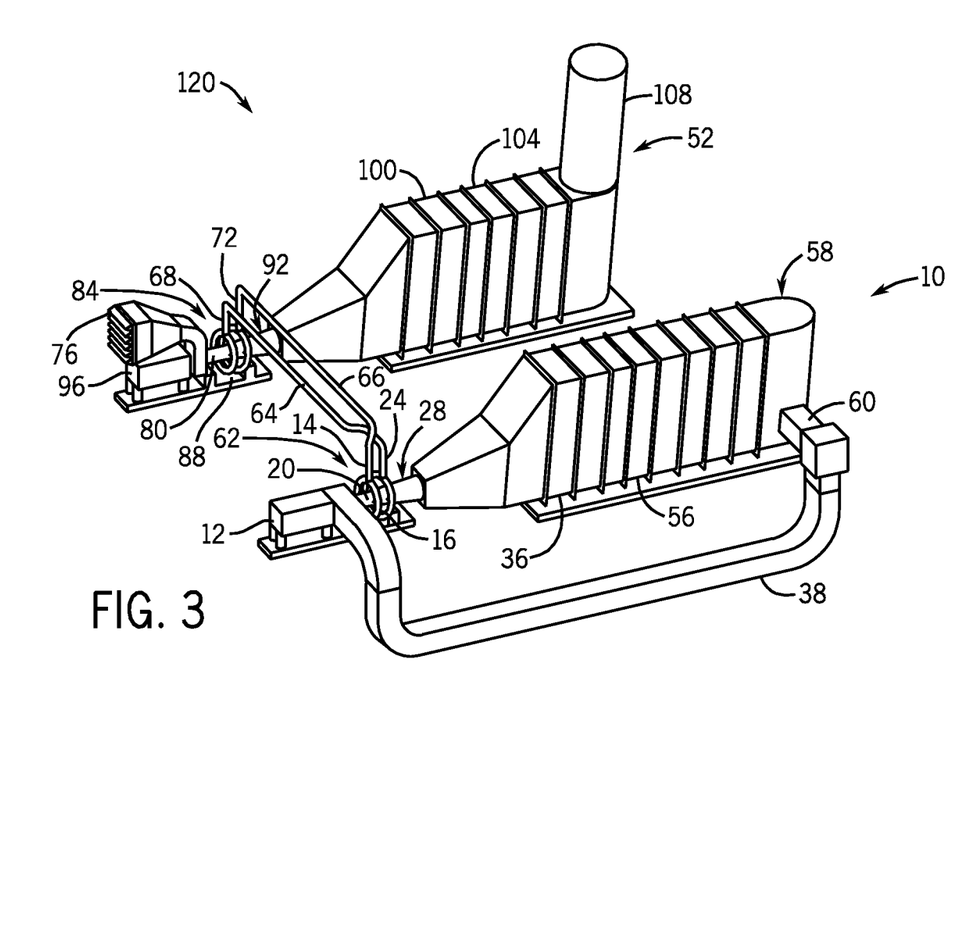
FIG. 3 is a diagrammatic illustration of a gas turbine engine system having two interconnected gas turbine engines, and one of the gas turbine engines is configured to recirculate exhaust gas for use as a working fluid, in accordance with one embodiment of the present disclosure.
Figure 4:
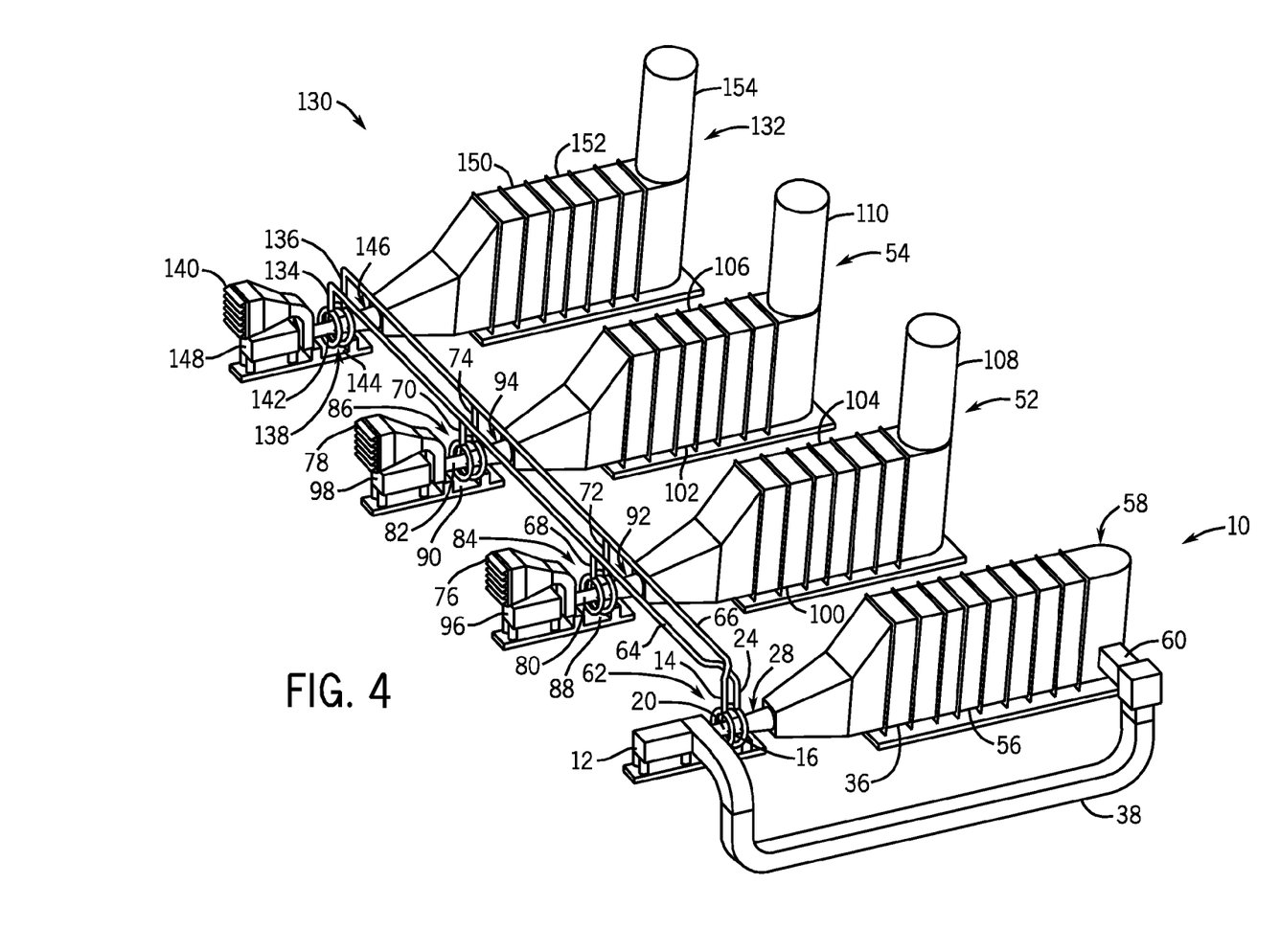
FIG. 4 is a diagrammatic illustration of a gas turbine engine system having four interconnected gas turbine engines, and one of the gas turbine engines is configured to recirculate exhaust gas for use as a working fluid, in accordance with one embodiment of the present disclosure.

While the system 50 has been described as having three gas turbine engines (the EGR gas turbine engine 10, the first gas turbine engine 52 and the second gas turbine engine 54), it should be noted that the present approaches are also applicable to systems employing any number of gas turbine engines in addition to one or more EGR gas turbine engines. FIGS. 3 and 4 illustrate two such embodiments, with their respective systems having two and four total gas turbine engines, respectively. FIG. 3 is an embodiment of a system 120 having the EGR gas turbine engine 10 and the first gas turbine engine 52.

As noted above, the first gas turbine engine 52 may be a gas turbine engine that has the first EGR inlet 68 plumbed directly into the first combustor 88. Further, the first combustor area 84 has been plumbed to allow a portion of compressed air 14 to be removed via the first compressed air outlet 72. It should be noted that the mode of operation of the system 120 may be the same or similar to the operation of the system 50. For example, the EGR gas turbine engine 10 may be plumbed such that there is approximately a 40%±10% bleed off of compressed EGR 18 (as the exported EGR 24) that is sent to the first gas turbine engine 52. Indeed, the approximate 60-40 ratio of EGR to compressed air suitable for stoichiometric combustion remains substantially unchanged, regardless of the number of gas turbine engines, as noted above. Accordingly, rather than approximately 20% of the compressed air 14 being removed from the first combustor area 84 as in FIG. 2, approximately 40% is so removed in the embodiment of system 120. Therefore, approximately 40% of the compressed EGR 18 (as the exported EGR 24) is provided to the first combustor 88 via the first EGR inlet 68, and approximately 40% of the compressed air 14 is withdrawn into the compressed air conduit 66 via the first compressed air outlet 72. While the 60-40 ratio is suitable for stoichiometric combustion, it should be noted that the relative amounts of compressed air 14 and exported EGR 24 may fluctuate, such as between approximately 40%±10%.

As noted above, a system 130 having four total gas turbine engines (one EGR gas turbine engine and three gas turbine engines) is depicted in FIG. 4. The system 130 includes the EGR gas turbine engine 10 that exports EGR to and receives compressed air from one or more gas turbine engines, the first gas turbine engine 52, the second gas turbine engine 54, and a third gas turbine engine 132. It should be noted that the system 130 may operate in a similar or the same fashion as systems 50 and 120 described above with respect to FIGS. 2 and 3, respectively. However, system 130 has differing amounts of compressed air 14 and exported EGR 24 being sent from and delivered to each gas turbine engine.

For example, the exported EGR 24 flowing from the EGR combustor area 62 may still represent approximately 40%±10% of the total compressed EGR 18 exiting the EGR compressor 20. However, rather than delivering approximately 20% to each gas turbine as in FIG. 2 or 40% as in FIG. 3, each of the first, second, and third gas turbine engines 52, 54, and 132 receives approximately 13.3% of the total compressed EGR stream 18 (approximately 40%±10% divided substantially equally among three gas turbine engines).

Therefore, in addition to (substantially concurrently to) the processes described above with respect to the operation of system 50 in FIG. 2, the third gas turbine engine 132 receives exported EGR 24 via a third EGR inlet 134 from the compressed EGR conduit 64. Conversely, a portion of compressed air 14 produced by the third gas turbine engine 132 exits into a third compressed air outlet 136 and enters into the compressed air conduit 66. The compressed air 14 is subsequently delivered directly into the combustor 16 of the EGR gas turbine engine 10.

As with the first and second gas turbine engines 52 and 54, the third compressed EGR inlet 134 and the third compressed air outlet 136 are both disposed in a third combustor area 138. The third combustor area 138 is disposed downstream of a third air intake 140 between a third air compressor 142 and a third combustor 144. Specifically, the third compressed air outlet 136 is disposed just upstream of the third combustor 144, such that air entering into the third air intake 140 is compressed by the third compressor 142. The compressed air 14 is then substantially immediately split into a portion delivered to the third combustor 144 and another portion that is exported as the compressed air 14 delivered directly to the combustor 16 of the EGR gas turbine 10.

The portion of the compressed air 14 that is directed to the third combustor 144 mixes with the exported EGR 24 delivered directly into the third combustor 144, and is combusted along with a carbonaceous fuel. It should be noted that, as above, the exported EGR 24 may contain CO, which is able to be used as a fuel. The combustion process within the third combustor 144 produces hot combustion gases, which enters a third turbine 146. The third turbine 146 extracts work from the hot combustion gases and outputs exhaust gases, the process of which drives the third compressor 142 and/or a third load 148.

The exhaust gases exiting the third turbine 146 are then directed to a third HRSG 150 having a third catalyst section 152. As with the first and second gas turbine engines 52 and 54 described above with respect to FIG. 2, the third catalyst section 152 includes a CO catalyst that is configured to destroy substantially all CO present within the exhaust gases to produce $CO_2$. The CO catalyst within the third catalyst section 152 may operate at a temperature of between approximately 500 and 700° F. (e.g., approximately 500, 600 or 700° F.) to produce $CO_2$ and $N_2$ from $NO_x$ and CO. Therefore, the exhaust gases, via dilution by the exported EGR 24 and by treatment with the third catalyst section 152, may contain lower levels of $NO_x$ compared to conventional configurations (e.g., between approximately 10 and 40% lower). Once the third catalyst section 152 has treated the exhaust gases, a third exhaust stack 154 enables the exhaust gases to exit the third gas turbine engine 132 for internal or external use. For example, the $CO_2$-containing, substantially $NO_x$-free exhaust gas (e.g., no more than approximately 2, 5, 10, or 15 parts per million by volume (ppmv) $NO_x$) may have a number of uses, including export for chemical synthesis, carbon capture and/or gasification.

Figure 5:
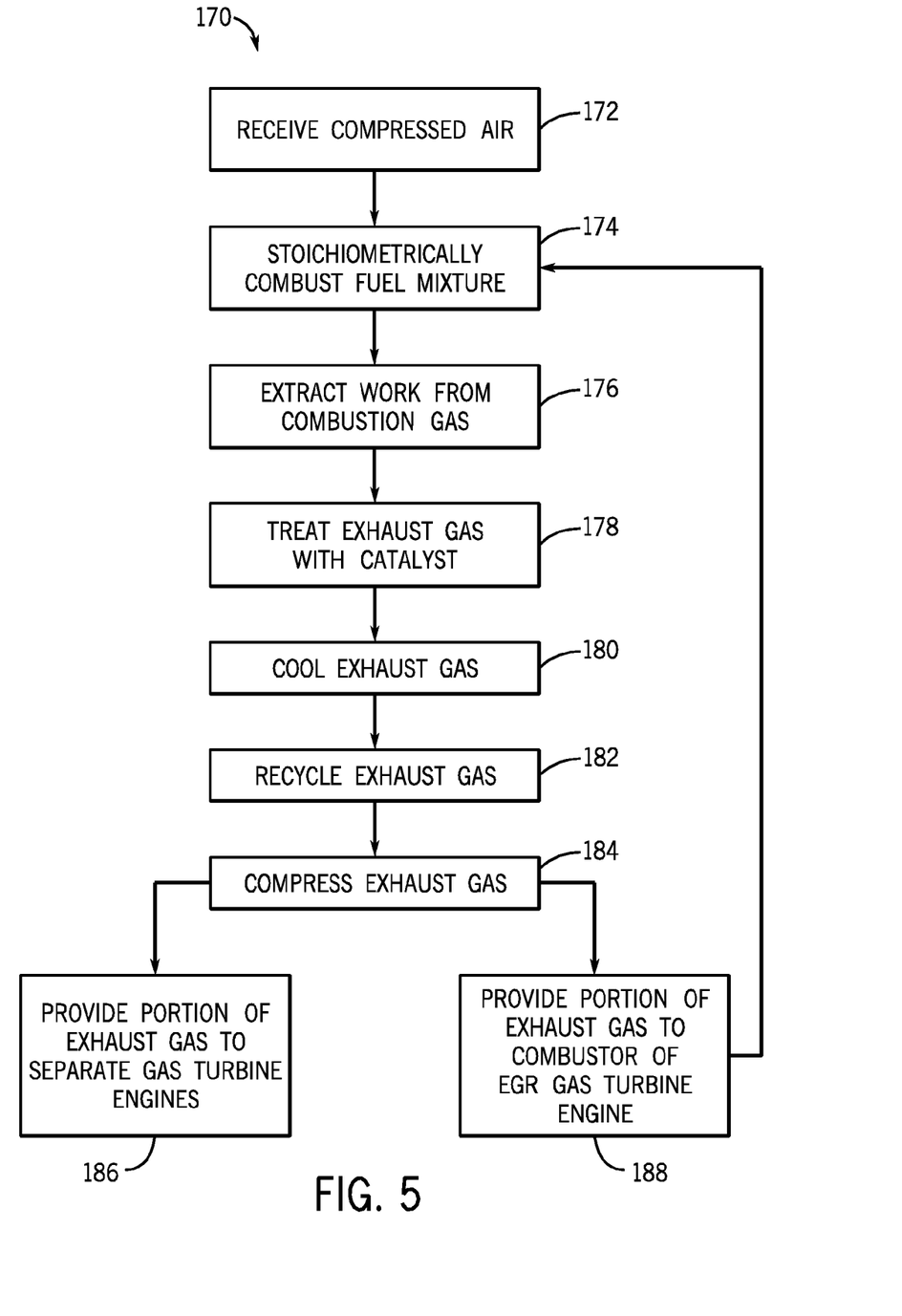
FIG. 5 is a process flow diagram of a method of operation of a gas turbine engine configured to recirculate exhaust gas for use as a combustion fuel, in accordance with one embodiment of the present disclosure.

Accordingly, the present approaches, described in the context of the gas turbine engine system embodiments above, also provide a method 170 of operation of a gas turbine engine system, which is illustrated in FIG. 5 as a process flow diagram. As noted above, the approaches described herein are applicable to any number of gas turbine engines within a system, where at least one of the gas turbine engines is a stoichiometric EGR gas turbine engine that receives compressed air (block 172) from one or more separate gas turbine engines directly into its combustor. The EGR gas turbine engine stoichiometrically combusts a fuel mixture (block 174), which may be a mixture of $O_2$ and compressed exhaust gases, as described above. As such, the resultant combustion gases may be substantially free of $O_2$ and may contain elevated levels of CO compared to non-stoichiometric combustion processes.

Once combustion is performed (block 174), the resultant combustion gases are directed to a gas turbine, which extracts work form the hot combustion gas (block 176). As described above, the hot combustion gases may cause rotation of blades within the gas turbine, which causes rotation of a shaft to drive a compressor and/or another load. Once work has been extracted from the hot combustion gas (block 176), the resultant exhaust gases are treated, for example, by a catalyst (block 178). The catalyst may be a $NO_x$ catalyst that is designed to reduce the levels of $NO_x$ within the exhaust gases. Additionally, the $NO_x$ catalyst may not have any substantial effect on the concentration of CO within the exhaust gases, as the CO may be utilized as fuel in a later step. In some embodiments, the exhaust gases may contain substantially no $O_2$, as excess $O_2$ after combustion (i.e., a non-stoichiometric combustion) may have a deleterious effect on the $NO_x$ catalyst.

After treatment by the NOx catalyst (block 178), the exhaust gases may pass through an exhaust section, such as an HRSG, where the exhaust gases cool while transferring heat to generate steam (block 180). For example, the exhaust gases may cool to between approximately 50 and 100° F., as described above with respect to FIG. 2. Upon cooling (block 180), the exhaust gases are recirculated back to the EGR gas turbine engine (block 182). As an example, the exhaust gases may be recirculated back to an inlet of a compressor of the EGR gas turbine engine. After the exhaust gas is recirculated back to the EGR gas turbine engine, it is compressed (block 184), for example, by the compressor driven at least partially by the gas turbine. According to the present approaches, the resultant compressed exhaust gas recirculation (EGR) is then divided into a first portion and a second portion. One portion is directed to one or more separate gas turbine engines (block 186), where the compressed EGR is injected directly into their respective combustors. In one embodiment, this portion represents approximately 40%±10% of the total compressed EGR. As noted above, the exported portion of compressed EGR may have a diluent effect within the combustors of the one or more separate gas turbine engines, and may also contain CO, which may be used as a fuel.

While the first portion of compressed EGR is provided to one or more separate gas turbine engines (block 186), another portion of the compressed EGR is provided to the combustor of the EGR gas turbine engine (block 188). In some embodiments, the second portion of compressed EGR represents approximately 60%±10% of the total compressed EGR. Once the second portion of the compressed EGR is provided into the combustor of the EGR gas turbine engine (block 188), the method 170 cycles back to combusting the fuel mixture (block 174), which initiates the subsequent acts described above. Further, it should be noted that the act of providing the compressed EGR to the combustor of the EGR gas turbine engine (block 188) and the act of receiving compressed air (block 172) from the one or more separate gas turbine engines may be performed substantially concurrently.

In the description above, reference has been made to a system employing two or more gas turbine engines, where at least one of the gas turbine engines is an EGR gas turbine engine. The EGR gas turbine engine exports EGR to respective combustors of the other gas turbine engines and receives compressed air directly into its combustor. Such a configuration may be implemented in a variety of scenarios, such as systems configured to produce power. One example of an implementation of the approaches described above is provided with reference to FIG. 6, which is a diagrammatic illustration of an integrated gasification-combined cycle power plant 200. The IGCC system 200 may be powered by synthetic gas, i.e., syngas. Elements of the IGCC system 200 may include a fuel source 202, such as a solid feed, that may be utilized as a source of energy for the IGCC system 200. The fuel source 202 may include coal (including low sulfur content coal), petroleum coke, biomass, wood-based materials, agricultural wastes, tars, coke oven gas and asphalt, or other carbon containing items.

Figure 6:
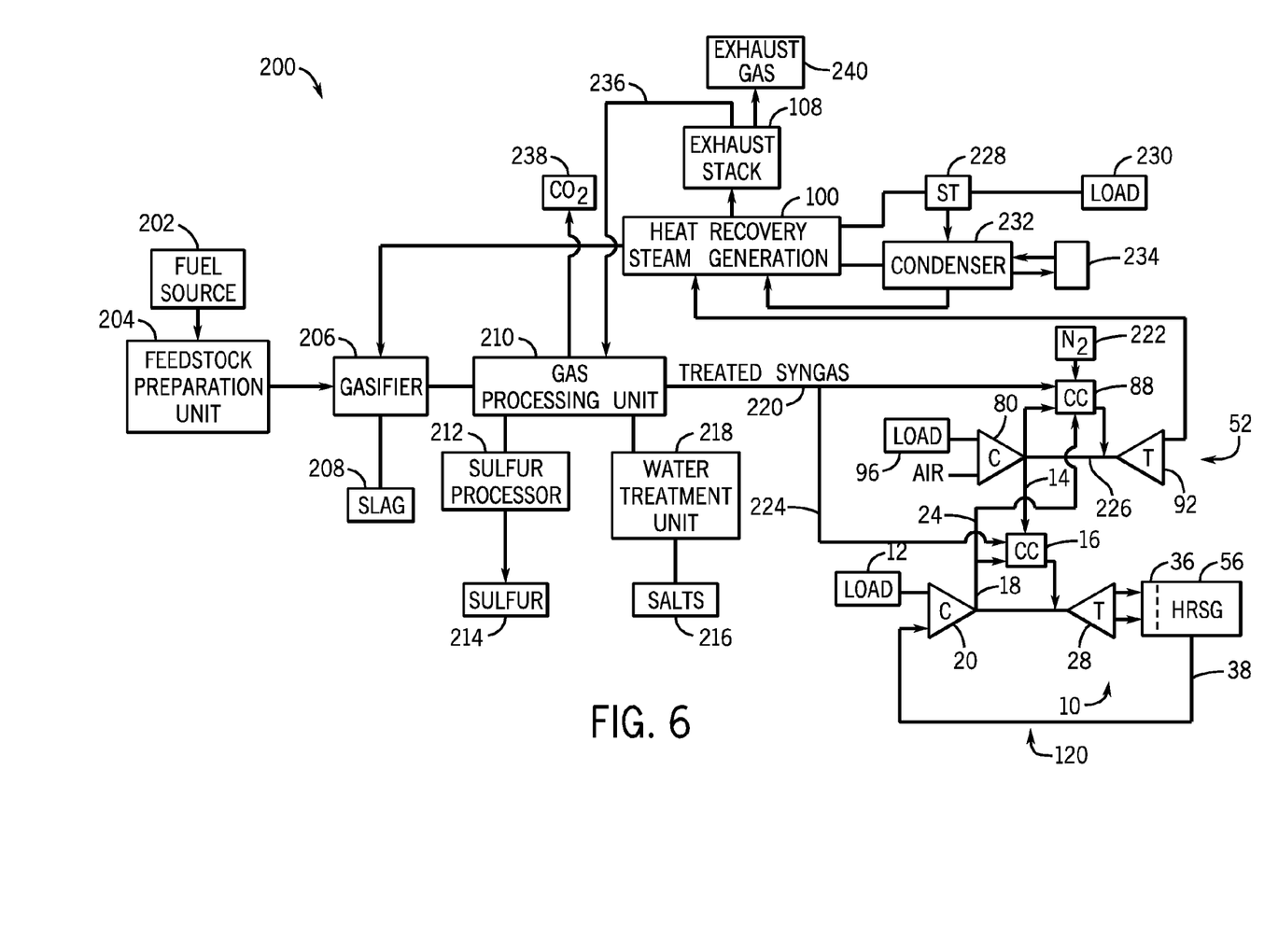
FIG. 6 is a block diagram of an integrated gasification combined cycle (IGCC) plant having one or more gas turbine engines configured to perform stoichiometric combustion of recirculated exhaust gas.

The solid fuel of the fuel source 202 may be passed to a feedstock preparation unit 204. The feedstock preparation unit 204 may, for example, resize or reshape the fuel source 202 by chopping, milling, shredding, pulverizing, briquetting, or palletizing the fuel source 202 to generate feedstock. Additionally, water or other suitable liquids may be added to the fuel source 202 in the feedstock preparation unit 204 to create slurry feedstock. In other embodiments, no liquid is added to the fuel source, thus yielding dry feedstock.

The feedstock may be passed to a gasifier 206 from the feedstock preparation unit 204. The gasifier 206 may convert the feedstock into a syngas, e.g., a combination of carbon monoxide (CO) and hydrogen ($H_2$). Temperatures inside the gasifier 206 may range from approximately 150° C. to 700° C. during the pyrolysis process, depending on the fuel source 202 utilized to generate the feedstock.

A combustion process may occur in the gasifier 206. The combustion may include introducing oxygen to the char and residue gases. The char and residue gases may react with the oxygen to form carbon dioxide ($CO_2$) and CO, which provides heat for subsequent gasification reactions. The temperatures during the combustion process may range from approximately 700° C. to 1600° C. Next, steam may be introduced into the gasifier 206 during a gasification step. The char may react with the $CO_2$ and steam to produce CO and $H_2$ at temperatures ranging from approximately 800° C. to 1100° C. In essence, the gasifier utilizes steam and oxygen to allow some of the feedstock to be "burned" to produce CO and energy, which drives a second reaction that converts further feedstock to $H_2$ and additional $CO_2$.

A gas mixture is produced in the gasifier 206. The gas mixture may be considered untreated, raw, or sour syngas and may include up to approximately 20 percent by volume $H_2S$. The gasifier 206 may also generate slag 208, which may be a wet ash material. The slag 208 may be removed from the gasifier 206 and utilized as road base or as another building material. The gas mixture is then passed to a gas processing unit 210 for removal of various non-syngas components.

In general, the gas processing unit 210 may receive the untreated syngas and remove a number of gases, including HCl, HF, COS, HCN, and $H_2S$ from the untreated syngas. Further, the gas processing unit 210 may transmit $H_2S$-rich gas to a sulfur processor 212, such as a Claus reactor. The $H_2S$ gas may be processed by the sulfur processor 212 to generate sulfur 214 for export. Salts 216 may be separated from the untreated syngas via a water treatment unit 218 that utilizes water purification techniques to generate usable salts 216 from the untreated syngas.

The gas processing unit 210 may also be configured to perform carbon dioxide ($CO_2$) capture. In one embodiment, the $CO_2$-containing exhaust gases generated by the gas turbine engine system (such as systems 50, 120, or 130) may be provided to features connected to or within the gas processing unit 210 for subsequent purification and carbon sequestration, as described in further detail below with respect to the gas turbine engine configuration. Subsequent and/or substantially simultaneously to some the processes described above, the gas exiting the gas processing unit 210 along path 220 may be considered a treated, sweetened, and/or purified syngas. That is, the syngas may be substantially free of sulfur, as well as residual gas components.

The treated syngas exiting the gas processing unit 210 may be of sufficient purity for use as fuel. For example, in some embodiments, the treated syngas exiting the gas processing unit 210 may include between approximately 0 and 10% $CO_2$. Further, the remaining volume may have anywhere from a 1:1 to 4:1 molar ratio of $H_2$ to CO. According to the embodiments described herein, the treated syngas is transmitted along the path 220 to the gas turbine engine system 120, which is described above with respect to FIGS. 2 and 3. As noted above, the gas turbine engine system contains the gas turbine engine 52 that is generally configured to combust a mixture of the treated syngas, compressed air, and exported EGR 24 from the EGR gas turbine engine 10. The system 120 also includes the EGR gas turbine engine 10, which receives compressed air 14 from the first gas turbine engine 52 and transmits a stream of exported EGR 24 to the same.

During operation of the IGCC system 200, the treated syngas is provided directly to the first combustor 88, e.g., a combustion chamber of the first gas turbine engine 52 as combustible fuel. Compressed nitrogen 222 may also be provided to the first combustor 88 via, for example, a diluent nitrogen (DGAN) compressor. The first combustor 88 receives fuel, such as the treated syngas, which may be injected under pressure from fuel nozzles. The treated syngas fuel may be mixed with the compressed air 14 (FIG. 2) as well as the compressed nitrogen 222 and combusted. The combustion may generate hot pressurized exhaust gases. It should be noted that at initial startup of the IGCC system 200 and, more specifically, the gas turbine engine system 120, that treated syngas may also be provided to the EGR gas turbine engine 10 to initially generate exhaust gases, which is represented as the dashed stream 224. Alternatively and/or additionally, the compressed air 14 may also carry a portion of the treated syngas for such a purpose.

As noted above, the combustor 16 of the EGR gas turbine engine 10 directs compressed exported EGR 24 into the first combustor 88. Upon combustion within the first combustor 88, the resultant combustion gases are directed to the first turbine 92. As the combustion gases from the first combustor 88 pass through the first turbine 92, the exhaust gases may force turbine blades in the turbine 92 to rotate a first drive shaft 226 along an axis of the first gas turbine engine 52. As with the EGR gas turbine engine 10 described with respect to FIG. 1, the drive shaft 226 is connected to various components of the first gas turbine engine 52, including the first compressor 80. The resultant exhaust gases then exit the first turbine 92 and are directed to the first HRSG 100, as described above in FIG. 2.

The IGCC system 200 also may include a steam turbine engine 228 that utilizes at least a portion of the steam generated by the first HRSG 100. Accordingly, the steam turbine engine 228 may drive a load 230. The load 230 may be an electrical generator for generating electrical power. It should be noted that although the gas turbine engines 10 and 52 and the steam turbine engine 228 may drive separate loads as shown in the illustrated embodiment, that the turbine engines 10, 52, and 228 may be utilized in tandem to drive a single load via a single shaft. The specific configuration of the steam turbine engine 228, as well as the gas turbine engines 10 and 52 may be implementation-specific and may include any combination of sections.

During operation, the steam turbine engine 228 may generate exhaust, which may include low-pressure steam or condensed water. Exhaust from, for example, a low-pressure section of the steam turbine engine 228 may be directed into a condenser 232. The condenser 232 may utilize a cooling tower 234 to exchange heated water for chilled water, which also aids in the condensation process. Condensate from the condenser 232 may, in turn, be directed into the first HRSG 100. The hot exhaust gases produced by the first gas turbine engine 92 and that are directed into the first HRSG 100 heat the water from the condenser 232 to produce steam. The exhaust gases then exit the first HRSG 100 via exhaust stack 108 and, in some embodiments, are directed as an exhaust stream 236 to a carbon capture section of the gas processing unit 210 to generate captured $CO_2$ 238. Further, it should be noted that all or a portion of the exhaust may exit the exhaust stack 108 to the atmosphere as exhaust gas 240.

The steam that is produced by the first HRSG 100 may be high-pressure, high-temperature steam. In addition to being provided to the steam turbine engine 228, the produced steam may also be supplied to any other processes where steam may be used, such as to the gasifier 206. The gas turbine engine system 120 generation cycle is often referred to as the "topping cycle," whereas the steam turbine engine 228 generation cycle is often referred to as the "bottoming cycle." By combining these two cycles as illustrated in FIG. 6, the IGCC system 200 may lead to greater efficiencies in both cycles. In particular, exhaust heat from the topping cycle may be captured and used to generate steam for use in the bottoming cycle.

It should be noted that while the presence of a steam turbine engine, condenser, cooling tower, and electrical generator has been discussed in the context of the first gas turbine engine 52, that the HRSG 56 of the EGR gas turbine engine 10 may also be coupled to similar respective features. Indeed, in some embodiments, the HRSG 56 and the HRSG 100 may drive the same steam turbine, load, and so forth. Accordingly, it should be noted that a number of configurations may be possible, where the EGR gas turbine engine 10 and the first gas turbine engine 52 (and other gas turbine engines, in some configurations) share common or the same features, including but not limited to loads, steam turbine engines, cooling towers, condensers, and so forth.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
    a first gas turbine engine, comprising:
        a first combustor configured to stoichiometrically combust a first mixture to produce a first combustion gas;
        a first turbine configured to extract work from the first combustion gas and output a first exhaust gas; and
        a first compressor fluidly coupled to an output of the first turbine and configured to compress the first exhaust gas to produce a compressed exhaust gas, wherein the first gas turbine engine routes a first portion of the compressed exhaust gas to the first combustor, wherein the first gas turbine engine is configured to export a second portion of the compressed exhaust gas directly to additional combustors of additional gas turbine engines, and wherein the second portion of the compressed exhaust gas is between approximately 30 percent and 50 percent of a total amount of the compressed exhaust gas produced by the first gas turbine engine.

2. The system of claim 1, wherein the first combustor is configured to receive a first air intake from a second compressor of a second gas turbine engine, and the first compressor is configured to output the second portion of the compressed exhaust gas to a second combustor of the second gas turbine engine.

3. The system of claim 2, wherein the first combustor is configured to receive a second air intake from a third compressor of a third gas turbine engine, and the first compressor is configured to output the second portion of the compressed exhaust gas to the second combustor of the second gas turbine engine and to a third combustor of the third gas turbine engine.

4. The system of claim 3, wherein the first combustor is configured to receive a third air intake from a fourth compressor of a fourth gas turbine engine, and the first compressor is configured to output the second portion of the compressed exhaust gas to the second combustor of the second gas turbine engine, the third combustor of the third gas turbine engine, and a fourth combustor of the fourth gas turbine engine.

5. The system of claim 1, wherein the first combustor is configured to combust the first mixture stoichiometrically to produce the first combustion gas at least substantially free of oxygen.

6. The system of claim 1, wherein the first gas turbine engine excludes an exhaust stack, and the first gas turbine engine is configured to provide exhaust gas recirculation (EGR) of all of the first exhaust gas.

7. The system of claim 1, comprising a first exhaust path from the first gas turbine engine, wherein the first exhaust path excludes a carbon monoxide (CO) catalyst.

8. The system of claim 1, comprising a conduit fluidly coupling a compressed exhaust gas outlet of the first gas turbine engine to an exhaust gas inlet of one of the additional combustors.

9. A system, comprising:
    a first gas turbine engine, comprising:
        a first compressor configured to intake air and produce a first compressed air;
        a first combustor configured to combust a first mixture to produce a first combustion gas, wherein the first mixture comprises a first fuel, at least a first portion of the first compressed air, and a first portion of a compressed exhaust gas output exported from an exhaust gas outlet of a second gas turbine engine, wherein the compressed exhaust gas output exported from the second gas turbine engine is between approximately 30 percent and 50 percent of a total amount of compressed exhaust gas generated by the second gas turbine engine; and
        a first turbine configured to extract work from the first combustion gas; and
        a conduit directly coupling the exhaust gas outlet of the second gas turbine engine to an exhaust gas inlet of the first combustor such that the first combustor receives the first portion of the compressed exhaust gas output.

10. The system of claim 9, wherein the first compressor is configured to output a second portion of the first compressed air to the second gas turbine engine.

11. The system of claim 10, comprising the second gas turbine engine having a second compressor, a second combustor, and a second turbine, wherein the second compressor is configured to compress exhaust gas prior to delivery to the first combustor, and the second combustor is configured to receive the second portion of the first compressed air downstream of the second compressor.

12. The system of claim 11, comprising a third gas turbine engine having a third compressor, a third combustor, and a third turbine, wherein the third combustor is configured to receive a second portion of the compressed exhaust gas output exported from the second gas turbine engine.

13. The system of claim 9, comprising a first exhaust path from the first gas turbine engine, wherein the first exhaust path includes at least one carbon monoxide (CO) catalyst, the second gas turbine engine comprises a second exhaust path from the second gas turbine engine, and the second exhaust path excludes any carbon monoxide (CO) catalyst.

14. The system of claim 9, comprising a first exhaust path from the first gas turbine engine, wherein the first exhaust path includes at least one exhaust stack, the second gas turbine engine comprises a second exhaust path from the second gas turbine engine, and the second exhaust path excludes any exhaust stack.

15. A method of operation of a gas turbine engine system, comprising:
combusting a fuel within a first combustor of a first gas turbine engine to produce a combustion gas;
extracting work from the combustion gas using a first turbine of the first gas turbine engine to produce an exhaust gas;
compressing the exhaust gas using a compressor of the first gas turbine engine to produce a compressed exhaust gas;
providing a first portion of the compressed exhaust gas from the compressor back to the first combustor;
providing a second portion of the compressed exhaust gas from the compressor directly to one or more separate gas turbine engines, wherein the second portion of the compressed exhaust gas is between approximately 30 percent and 50 percent of the compressed exhaust gas generated by the compressor of the first gas turbine engine; and
using the second portion of the compressed exhaust gas in the one or more separate gas turbine engines as a diluent for combustion to control peak flame temperatures in respective combustors of the one or more separate gas turbine engines.

16. The method of claim 15, wherein providing the second portion of the compressed exhaust gas directly to the one or more separate gas turbine engines comprises providing an even distribution of the second portion of the compressed exhaust gas directly to respective combustors of the one or more separate gas turbine engines.

17. The method of claim 15, comprising receiving compressed air into the first combustor of the first gas turbine engine prior to combusting the fuel, wherein the compressed air is provided by the one or more separate gas turbine engines.

18. The method of claim 17, wherein combusting the fuel comprises combusting a mixture of the compressed exhaust gas and the compressed air, and the combustion is performed stoichiometrically to produce the combustion gas, wherein the combustion gas is substantially free of oxygen.

* * * * *